United States Patent Office 3,445,393
Patented May 20, 1969

3,445,393
PACKING AND SEALING COMPOSITION
Cyril Hinds, Lafayette, La., assignor to Oil Center Research, Inc., Lafayette, La., a corporation of Louisiana
No Drawing. Continuation of application Ser. No. 331,359, Dec. 18, 1963. This application Mar. 21, 1967, Ser. No. 624,964
Int. Cl. C10m 1/30, 3/24, 5/18
U.S. Cl. 252—58                    18 Claims

ABSTRACT OF THE DISCLOSURE

A packing and sealing composition which comprises comminuted particles of a polymer selected from the group consisting of polytetrafluoroethylene, polytrifluorochloroethylene, polyvinylidene fluoride and the copolymer of hexafluoropropylene and tetrafluoroethylene, wherein the polymer is sintered and incorporated in a lubricant carrier characterized by an easily extrudable fluid or paste consistency. The invention includes the utilization of sealing and packing compositions of the aforementioned formulation as packing, in stuffing boxes and the like for the sealing or reciprocating or rotating shafts passing therethrough.

---

This application is a continuation of application Ser. No. 331,359, filed Dec. 18, 1963, which is a continuation-in-part of application Ser. No. 314,882, filed Oct. 9, 1963, both now abandoned.

The invention relates to a composition to be used as a packing and sealing material. More particularly, it is to be used as a packing, sealing and bearing material for packing glands and stuffing boxes which encircle either reciprocating or rotating shafts and as a thread sealing material for connections between threaded members. This invention also relates to a method of introducing and maintaining a packing and sealing material in a packing gland or stuffing box without interrupting the operation of the shaft encircled therein.

In connection with packing and sealing materials for packing glands and stuffing boxes, the usefulness and value of such material depend upon the length of time such material can be used before the shaft encircled within the gland or box must be shut down in order to replace the packing material. In the operation of pumps and the like, it is this shut down time during which the facility is not in operation that is very costly to the efficiency of the overall operation. Accordingly, considerable time and effort have been expended in attempting to develop a packing, sealing and bearing material together with a method for maintaining the material in the packing gland or stuffing box which cuts down the shut down time and the number of shut downs over a certain period of time without detracting from the primary function of packing, sealing and bearing the moving shaft.

In recent years widespread use has been made of the molded polymerization products of fluorinated hydrocarbons such as tetrafluoroethylene, trifluorochloroethylene, vinylidene fluoride etc., and copolymers of tetrafluoroethylene and hexafluoropropylene and the like as gaskets and packing for pumps and the like. These polymers and copolymers have to some extent replaced the age-old use of rope-like materials which are wound around the shaft in the packing gland or stuffing box area to act as the packing, sealing and bearing material. However, regardless of which of the previously known materials is used as the packing, sealing and bearing material, it is necessary once the material is sufficiently worn to shut down the pump or device operating on the shaft in order to repack the packing gland or stuffing box.

Similar endeavor has been expended in attempting to develop a thread sealing material which will satisfactorily insure that no material will leak through the connection between the threaded members. Leakage not only causes loss of valuable material but also in a great number of cases is hazardous due to the composition of such material.

Efforts in both instances have been directed toward the development of materials which will withstand high temperature and pressure variations and be chemically resistant in order that the material will be adaptable to a greater variety of uses.

Accordingly, it is the primary object of the composition of this invention to substantially reduce the number of times a particular pump or device operating on a reciprocating or revolving shaft need be shut down.

Another primary object is to eliminate the necessity of shutting down a device operating on a reciprocating or revolving shaft due to the necessity of replacing worn packing, sealing and bearing material in the packing gland or stuffing box.

A further primary object of the composition of this invention is to effectively seal connections between thread members against leakage of material and prevent galling therebetween.

An additional object of this invention resides in the ability of the instant composition to be intermittently introduced into a packing gland or stuffing box or thread connection in order to replenish the worn or exhausted material therein.

Still further an objective of this invention is the method of introducing this additional material into the packing gland or stuffing box without the necessity of interrupting the operation of the shaft or system and thereby avoiding loss of operation because of shutdown.

An additional object of this invention is to pack and seal moving parts where present packing materials are not capable of being installed.

A further aspect of this invention resides in the effectiveness of the disclosed composition over a wide range of temperatures and pressures and in contact with a wide range of chemicals, such as acids, oils, caustics or any common solvents.

The above and other objects are secured, in accordance with this invention, by the comminution of an appropriate thermoplastic material or materials having high pressure, temperature and chemical resistance into particles and the combination of such particles with an appropriate carrier.

More specifically, this invention involves the comminution of processed fluorinated polymers such as polytetrafluoroethylene, polytrifluorochloroethylene, polyvinylidene fluoride, etc., and the copolymer of tetrafluoroethylene and hexafluoropropylene into small flaked or granulated particles having a size greater than the maximum clearance involved. In the case of a packing gland or stuffing box it would be the maximum clearance which exists between the shaft and the end of the housing of the packing gland or stuffing box encircling the shaft. The above mentioned fluorinated polymers are similar to those products available commercially under the registered tradenames Teflon, Kel-F, Kynar and Halon, respectively. (The fluorinated polymers are hereinafter referred to as fluorocarbon resins.) These particles are added to a suitable carrier whereby the processed fluorocarbon resins and the carrier will form a composition having a paste-like consistency which can be easily applied to connection threads and the like and extruded into a packing gland or stuffing box.

With respect to use in packing glands and stuffing boxes, an amount of the composition is initially extruded into the gland or box sufficient to fill it through an easily accessible opening in the exterior thereof. Thereafter, due to the operation of the encircled shaft when a certain amount of the packing, sealing and bearing material becomes worn and dissipates, it is only necessary to extrude through the opening additional fresh composition without interrupting the operation of the shaft. While the method of this invention is primarily applicable to the stuffing box elements disclosed and claimed in my pending U.S. application Ser. No. 314,948, filed Oct. 9, 1963, now Patent No. 3,288,473, issued Nov. 29, 1966, it has been found that conventional packing glands and stuffing boxes can easily be adapted to utilize the novel composition and therefore method of this invention. Furthermore, the packing and sealing composition of this invention, while appropriate wherever packing is used, can also be utilized in apparatus where packing is necessary but present packing materials cannot be installed. Examples of such apparatus are: designs not permitting disassembly of the apparatus to install or change packing; designs lacking the necessary volume or clearance for packing; designs where only a very small line can be laid to packing; designs prohibiting setting of packing due to nonfluid character; and packing surfaces having cuts and bruises caused during machining or handling or corrosion.

Raw or virgin fluorocarbon resins are processed by various well known methods to produce "processed" or "sintered" resins. While these methods are somewhat diverse, the general technique embodies three basic steps. First, the resin is cold pressed or preformed under a high pressure; second, the resin is sintered by heating the preform above the gel point in order to achieve cohesion among the particles; and third, cooling the sintered sample in a manner to achieve the desired crystallinity. During this processing as well known to the art, the raw or virgin fluorocarbon resin (especially polytetrafluoroethylene) undergoes a considerable change in properties. The three factors primarily affected by the preforming, sintering and cooling process are molecular weight, crystallinity, and void content. Others affected but to a lesser degree are density, compressive and tensile strength, flexural modulus (stiffness), shear strength, impact strength, abrasion resistance, resistance to deformation and flow, flexibility and chemical resistance, not to mention electrical, optical, etc. properties. The changes in the properties affected in the fluorocarbon resins due to this process are well known and produce a sintered resin having a specific gravity within the range from 2.1 to 2.2. Such information is readily available in connection with polytetrafluoroethylene in Effects of Fabrication on the Properties of Teflon Resins, by P. E. Thomas, J. F. Lontz, C. A. Sperati and J. L. McPherson (reprinted from the Society of Plastics Engineers Journal, volume 12, number 6, June 1956).

The processed fluorocarbon resins in accordance with this invention are ground by conventional grinding machines. The flakes are formed as byproducts of machining (lathe turnings) of the fluorocarbon resins and chopped into small particles in conventional chopping machines.

The carrier contemplated in the present invention is any conventional oil or grease lubricant or hydrocarbon-free vehicle having high-pressure and high film strength characteristics which when combined with the particles of the fluorocarbon resins will produce a product having a fluid or paste-like character and can be easily extruded.

With the foregoing general discussion in mind, there are given herewith detailed examples of the practice of this invention in order that a more complete understanding of the invnetion may be presented. All parts are given by weight.

*Example I.*—55 parts sintered polytetrafluoroethylene were comminuted to granulated particles which will pass through a mesh size of approximately 20 (Tyler Standard). The particles were combined with 45 parts high pressure, high film strength grease type lubricant having the following physical properties: specific gravity, 1.1; worked penetration, 315; melting point greater than 500° F. and waterproof. Such a grease lubricant is identical to that available commercially under the name Lubriplate 930AA (a trademark of Fiske Brothers Refining Co.). The ingredients are thoroughly admixed to produce a composition having a specific gravity of approximately 1.4 and a paste-like consistency which can be easily extruded into the packing gland or stuffing box through an opening in the exterior of such compartment. As the particles become worn to such a size that they are no longer retained in the packing gland or stuffing box due to the motion of the reciprocating or revolving shaft, it is only necessary to extrude into the box or gland additional composition having the requisite particle size through the external opening in order to replenish and refill the box or gland. This operation can be performed without interrupting the operation of the shaft or shutting down the apparatus. This composition and method for packing glands and stuffing boxes affords continuous maintenance for the life of the shaft encircled therein for temperatures between −450° F. and +500° F. and pressures less than 20,000 p.s.i. A composition including the sintered copolymer of tetrafluoroethylene and hexafluoropropylene instead of sintered polytetrafluoroethylene is operable over the temperature range between −450° F. and +400° F. Utilization of sintered polytrifluorochloroethylene or sintered polyvinylidene fluoride instead of sintered polytetrafluoroethylene in the composition affords operable temperature ranges of between −328° F. and +390° F. and between −328° F. and +300° F., respectively. While the above identified particle size is most applicable, it has been found that the particle size of the sintered fluorocarbon resin can vary between 400 mesh and 2 mesh (Tyler Standard) depending upon the maximum clearance between the shaft and the end of the housing of the particular stuffing box or packing gland without substantially detracting from the invention.

*Example II.*—45 parts sintered polytetrafluoroethylene were comminuted into flaked particles having a thickness no greater than 0.01 inch and a surface area no greater than 0.1 square inch. The flakes were then combined with 55 parts high pressure, high film strength grease lubricant, similar to that in Example I. The ingredients were admixed to form a material having a specific gravity of approximately 1.2 and a paste-like consistency which can be easily extruded into the packing gland or stuffing box. The composition is introduced and maintained in the gland or box in a manner similar to Example I. While the above identified flaked particle size has been found most desirable due to the acceptable tolerances between the shaft and the end of the housing of a packing gland or stuffing box for conventional pumps and the like, where the clearance is exceptionally high, it has been found satisfactory in connection with the present invention to increase the flake size up to one-quarter of an inch in thickness and up to one square inch in surface area.

*Example III.*—25 parts sintered polytetrafluoroethylene were ground into granulated particles having a size such that the particles will pass through a 20 mesh screen (Tyler Standard). 25 parts sintered polytetrafluoroethylene were comminuted into flaked particles having a thickness no greater than 0.01 inch and a surface area no greater than 0.10 square inch. The granulated and flaked particles were then admixed with 50 parts high pressure, high film strength grease lubricant, similar to that utilized in Example I, producing a composition which has a specific gravity of approximately 1.3 and a paste-like consistency. The composition was then introduced into an appropriate packing gland or stuffing box. As a specific reduction to practice of the composition comprising this invention the following resume is given. Prior to the advent of the present invention a group of municipal-owned pumps, city of Lafayette, State of Louisiana, specifications: 4″ Fairbanks Morse, horizontal-type sewer pump, utilized graphite rope packing and pumped semisolid sewer sludge. In practice, addition of packing rings was required every two weeks and complete repacking every four weeks. Further, the packing permitted a continual leak. On or about Aug. 1, 1963, the packing of these pumps was replaced by a packing, sealing and bearing element similar to that disclosed in FIG. 4 of my above-mentioned application for U.S. patent and into which was extruded a composition similar to that of this example. Additional composition is extruded into the gland approximately every eight hours with less than one-half a pound extruded per thirty days. It is expected that major servicing will not be required for at least two years from the installation, use of the composition comprising this invention will result in longer shaft life, and no leak from the packing has been experienced.

*Example IV.*—60 parts sintered polytetrafluoroethylene ground into granulated particles which will pass through a 20 mesh screen (Tyler Standard) were admixed with 40 parts high pressure, high film strength oil type lubricant having the following physical properties: specific gravity, 0.9; viscosity at 100° F., 826 centipoises; pour point, 5° F.; flash point, 450° F.; fire point, 500° F. Such an oil lubricant is identical to that available commercially under the name Lubriplate Hydraulic Oil No. 4 (a trademark of Fiske Brothers Refining Co.). The composition so formed has a specific gravity of approximately 1.2 and a fluid consistency for easy extrusion into a packing gland or stuffing box.

*Example V.*—40 parts sintered polytetrafluoroethylene granulated into particles which will pass through a 20 mesh screen (Tyler Standard) and 30 parts sintered polytetrafluoroethylene flaked into particles having a thickness not greater than 0.01″ and a surface area not greater than 0.10″ were admixed with 30 parts high pressure, high film strength oil lubricant, similar to that utilized in Example IV to form a composition having a specific gravity of approximately 1.3 and a fluid consistency.

*Example VI.*—55 parts sintered polytetrafluoroethylene were granulated into particles which will pass through a 20 mesh screen (Tyler Standard) and mixed with 45 parts high pressure, high film strength grease lubricant, similar to that utilized in Example I to produce a composition having properties similar to those defined in Example I. The composition was applied to 8-round thread tubing, casing, tool joints, drill collars and etc. and has been found effective to seal threaded connections and prevent leakage through at extreme pressures, in some instances as high as 60,000 p.s.i., and high temperatures up to 550° F.

*Example VII.*—62 parts sintered polytetrafluoroethylene were granulated to pass through a 100 mesh screen and admixed with 38 parts high pressure, high film strength grease lubricant, similar to that utilized in Example I. The combination was thoroughly mixed and the admixture was applied to bolt threads and pipes with ten threads or less.

*Example VIII.*—32 parts sintered polytetrafluoroethylene were granulated to pass through a 20 mesh screen (Tyler Standard) and 20 parts sintered polytetrafluoroethylene were flaked to a thickness not greater than 0.01 inch and a surface area not greater than 0.1 square inch. The particles were added to 48 parts high pressure, high film strength grease lubricant, similar to that utilized in Example I. The composition so formed was applied to coarse threads which were badly worn and which would normally permit fluid to seep out therethrough under pressure of slightly above atmospheric. In connection with the composition of this invention as a thread sealant, it has been found possible to utilize the fluorocarbon resins in particle sizes up to 5 mesh (Tyler Standard) for the granulated particles and one-quarter square inch in area for the flaked particles.

In the above examples, the quantities of the sintered fluorocarbon resin and the carrier have been specifically set forth. However, it has been found that departure from the disclosed amounts will not substantially detract from the effectiveness of the resultant composition as a packing and sealing material so long as the composition resulting from the admixture of the fluorocarbon resins and carrier has a consistency which will permit easy extrusion into the packing gland or stuffing box or application to the threaded member. Accordingly, it has been found that as little as 5% and as much as 95% of the total composition can comprise the fluorocarbon resin. Also, where both flaked and granulated fluorocarbon resins are combined with a suitable carrier, both the flaked and granulated components can comprise as much as 40% and as little as 20% of the overall composition. Moreover, it is not intended to restrict the invention to fluorocarbon resins only since it has been found that filler materials such as graphite and molybdenum sulfide produce effective results in combination with fluorocarbon resins. Furthermore, while the above examples specify either an oil lubricant or grease lubricant carrier it has been found that a combination of the two type carriers does not diminish the effective results achieved by the present invention and accordingly such a combination is fully contemplated as a part of the invention.

While the above describes the invention, it is to be understood that variations in the invention can be made without departing from the spirit thereof, and the scope of the invention is to be construed only with respect to the appended claims.

What is claimed as new is as follows:

1. A packing and sealing composition which comprises essentially comminuted particles of a polymer selected from the group consisting of polytetrafluoroethylene, polytrifluorochloroethylene, polyvinylidene fluoride and the copolymer of hexafluoropropylene and tetrafluoroethylene, after said polymer has been sintered under high pressure and temperature, and a lubricant carrier whereby the composition will have an easily extrudable fluid or paste consistency.

2. The packing and sealing composition of claim 1 wherein said polymer is polytetrafluoroethylene.

3. The packing and sealing composition of claim 1 wherein said polymer is a copolymer of tetrafluoroethylene and hexafluoropropylene and said particles are present in an amount of approximately 5–95% by weight of the total composition.

4. The packing and sealing composition of claim 1 wherein said polymer is polytrifluorochloroethylene.

5. The packing and sealing composition of claim 1 wherein said polymer is polyvinylidene fluoride and said carrier is of a grease lubricant type.

6. A packing and sealing composition which comprises by weight between 45% and 70% particles of a sintered polymer selected from the group consisting of polytetrafluoroethylene, polytrifluorochloroethylene, polyvinylidene fluoride and the copolymer of hexafluoropropylene and tetrafluoroethylene and between 30% and 55% of a carrier selected from the group consisting of an oil lubricant and a grease lubricant whereby the composition will have an easily extrudable fluid or paste-like consistency.

7. The packing and sealing composition of claim 6 wherein said polymer is polytetrafluoroethylene sintered under high temperature and high pressure and said carrier is of a high pressure and high film strength type.

8. The packing and sealing composition of claim 6 wherein said polymer has been comminuted to granular and flake forms, said granulated form polymer having a particle size between 400 mesh and 2 mesh, Tyler Standard, said flaked form polymer having a particle size thickness less than one-quarter of an inch and a particle size surface area less than one square inch, between 30% and 55% a carrier selected from the group consisting of an oil lubricant and a grease lubricant.

9. The packing and sealing composition of claim 1 wherein said polymer is polytetrafluoroethylene and is present in about 45–65% by weight of the total composition, said polymer being granulated and having a particle size which will pass through a 20 mesh screen, Tyler Standard, and said carrier selected from the group consisting of an oil lubricant having a 0.9 specific gravity and a viscosity of 826 centipoises at 100° F. and a grease lubricant having a 1.1 specific gravity and a melting point greater than 500° F.

10. The packing and sealing composition of claim 1 wherein said polymer is present in approximately 45% by weight of the total composition and is in a flaked form having a particle size thickness less than one-quarter of an inch and a particle size surface area of less than one square inch, and said carrier being of a high pressure, high film strength grease lubricant type having a 1.1 specific gravity and a melting point greater than 500° F., said composition having a specific gravity of approximately 1.2.

11. The packing and sealing composition of claim 8 wherein said polymer is polytetrafluoroethylene, said polymer being present approximately 25% by weight of the total composition in flaked form having a particle thickness less than 0.1 square inch, and approximately 25% by weight of the total composition in granular form having a particle size such that it will pass through a 20 mesh screen, Tyler Standard, and said carrier being of a high pressure, high film strength, grease lubricant type having a 1.1 specific gravity and a melting point greater than 500° F., said composition having a specific gravity of approximately 1.3.

12. The method of packing and sealing packing glands and stuffing boxes for a reciprocating or rotating shaft which comprises extruding into the packing gland or stuffing box a composition which consists of by weight between 5% and 95% particles of a polymer which has been sintered under high pressure and temperature selected from the group consisting of polytetrafluoroethylene, polytrifluorochloroethylene, polyvinylidene fluoride and the copolymer of hexafluoropropylene and tetrafluoroethylene and a lubricant carrier, without interrupting the operation of the shaft.

13. The method of claim 12 wherein said polymer is polytetrafluoroethylene.

14. The method of claim 12 wherein said carrier is of a high pressure and high film strength type selected from the group consisting of an oil lubricant and a grease lubricant and said particles have a particle size greater than the minimum clearance between the packing gland and the stuffing box and said shaft.

15. The method of claim 13 wherein said sintered polytetrafluoroethylene is present approximately 25% by weight of the total composition in flaked form having a particle thickness less than 0.01 inch and a particle surface area less than 0.1 square inch, and in granulated form having a particle size such that it will pass through a 20 mesh screen, Tyler Standard, and said carrier is present approximately 50% by weight of the total composition and is of a high pressure, high film strength grease lubricant type having a 1.1 specific gravity.

16. The method of claim 12 wherein said polymer is present approximately 45–65% by weight of the total composition and said carrier is of a high pressure and high film strength type selected from the group consisting of an oil lubricant having a 0.9 specific gravity and a 826 centipoise viscosity at 100° F. and a grease lubricant having a 1.1 specific gravity and a melting point greater than 500° F.

17. The method of supplying and replenishing a packing, sealing and bearing material in a packing gland or stuffing box encircling a reciprocating or rotating shaft which comprises extruding into said packing gland or stuffing box a sufficient quantity of a composition to fill the packing gland or stuffing box and intermittently extruding additional composition into the packing gland or stuffing box without interrupting the operation of the shaft, said composition consisting of by weight between 5% and 95% particles of a sintered polymer selected from the group consisting of polytetrafluoroethylene, polytrifluorochloroethylene, polyvinylidene fluoride and the copolymer of hexafluoropropylene and tetrafluoroethylene, said particles having a particle size greater than the maximum clearance between said packing gland or stuffing box and said shaft, and between 5% and 95% lubricant carrier.

18. An extrudable packaging and sealing composition for use in connection with a moving shaft within a housing which comprises a particulate sintered polymer selected from the group of polymers consisting of polytetrafluoroethylene, polytrifluorochloroethylene, polyvinylidene fluoride and the copolymer of hexafluoropropylene and tetrafluoroethylene, said sintered polymer having particle sizes larger than the maximum clearance between said shaft and said housing, and a lubricant carrier.

References Cited

UNITED STATES PATENTS

| | | | |
|---|---|---|---|
| 2,030,504 | 2/1936 | Davis. | |
| 2,504,936 | 4/1950 | Payne. | |
| 3,083,238 | 3/1963 | Hauptschien et al. | 252—58 |
| 3,199,876 | 8/1965 | Magos et al. | 277—21 |
| 3,247,116 | 4/1966 | Reiling | 252—58 |

FOREIGN PATENTS

| | | |
|---|---|---|
| 664,546 | 1/1952 | Great Britain. |

DANIEL E. WYMAN, *Primary Examiner.*

J. VAUGHN, *Assistant Examiner.*

U.S. Cl. X.R.

184—1, 37; 252—12; 264—242; 277—1, 72